United States Patent
Terada et al.

(10) Patent No.: US 12,465,851 B2
(45) Date of Patent: Nov. 11, 2025

(54) GAME PROGRAM, METHOD, AND INFORMATION PROCESSING DEVICE

(71) Applicant: The Pokémon Company, Tokyo (JP)

(72) Inventors: Yuki Terada, Tokyo (JP); Keisuke Miyagawa, Tokyo (JP)

(73) Assignee: THE POKÉMON COMPANY, Tokyo (JP)

( * ) Notice: Subject to any disclaimer, the term of this patent is extended or adjusted under 35 U.S.C. 154(b) by 377 days.

(21) Appl. No.: 18/073,591

(22) Filed: Dec. 2, 2022

(65) Prior Publication Data

US 2023/0097406 A1 Mar. 30, 2023

Related U.S. Application Data

(63) Continuation of application No. PCT/JP2021/018911, filed on May 19, 2021.

(30) Foreign Application Priority Data

Jun. 10, 2020 (JP) .................................. 2020-100989

(51) Int. Cl.
*A63F 13/45* (2014.01)
*A63F 13/35* (2014.01)
(Continued)

(52) U.S. Cl.
CPC .............. *A63F 13/45* (2014.09); *A63F 13/35* (2014.09); *A63F 13/533* (2014.09); *A63F 13/69* (2014.09);
(Continued)

(58) Field of Classification Search
CPC ........ A63F 13/212; A63F 13/22; A63F 13/45; A63F 13/35; A63F 13/40; A63F 13/48;
(Continued)

(56) References Cited

U.S. PATENT DOCUMENTS

| 10,708,186 | B2 | 7/2020 | Kurabayashi | |
| 12,070,696 | B2 * | 8/2024 | Thielbar | A63F 13/63 |

(Continued)

FOREIGN PATENT DOCUMENTS

| JP | 2005-291792 A | 10/2005 |
| JP | 2011-147562 A | 8/2011 |

(Continued)

OTHER PUBLICATIONS

English translation of Written Opinion mailed on Aug. 10, 2021, in corresponding PCT/JP2021/018911, 5 pages.

(Continued)

*Primary Examiner* — Omkar A Deodhar
(74) *Attorney, Agent, or Firm* — XSENSUS LLP

(57) ABSTRACT

A game that receives information about sleep of users maintains enjoyment of the game without placing an excessive load on a server. The game includes receiving an operation input from a user; setting a first time at which a game is to progress and making a predetermined notification at the first time when the operation input is not received before the first time arrives; changing a state of the notification based on the operation input of the user and accessing a server to progress the game; and distributing second times at which the computers of users are to access the server to progress the game.

16 Claims, 6 Drawing Sheets

(51) Int. Cl.
*A63F 13/533* (2014.01)
*A63F 13/69* (2014.01)
*G06F 9/4401* (2018.01)
*A63F 13/212* (2014.01)
*A63F 13/79* (2014.01)

(52) U.S. Cl.
CPC .......... *G06F 9/4418* (2013.01); *A63F 13/212* (2014.09); *A63F 13/79* (2014.09); *A63F 2300/1012* (2013.01); *A63F 2300/308* (2013.01); *A63F 2300/5526* (2013.01); *A63F 2300/5546* (2013.01); *A63F 2300/609* (2013.01)

(58) Field of Classification Search
CPC ...... A63F 13/49; A63F 13/493; A63F 13/533; A63F 13/69; A63F 13/79; G06F 9/4418
See application file for complete search history.

(56) References Cited

U.S. PATENT DOCUMENTS

| | | | | |
|---|---|---|---|---|
| 2016/0354688 | A1* | 12/2016 | Harkham | G07F 17/3281 |
| 2017/0136348 | A1* | 5/2017 | Hattori | A61B 5/742 |
| 2018/0307503 | A1* | 10/2018 | Peltz | G06F 13/161 |
| 2019/0282899 | A1* | 9/2019 | Karlsen | A63F 13/48 |
| 2020/0114267 | A1* | 4/2020 | Sakurai | A63F 13/5372 |
| 2020/0348968 | A1* | 11/2020 | Huchachar | G06F 9/445 |
| 2020/0368613 | A1* | 11/2020 | Kasawa | A63F 13/50 |
| 2021/0046385 | A1* | 2/2021 | Hsiao | A63F 13/48 |
| 2021/0205713 | A1 | 7/2021 | Shindo et al. | |

FOREIGN PATENT DOCUMENTS

| | | |
|---|---|---|
| JP | 5933076 B1 | 6/2016 |
| JP | 2020-44223 A | 3/2020 |
| WO | 2016/021235 A1 | 2/2016 |

OTHER PUBLICATIONS

International Search Report and Written Opinion mailed on Aug. 10, 2021, received for PCT Application PCT/JP2021/018911, filed on May 19, 2021, 10 pages including English Translation.

* cited by examiner

Fig. 4

STORAGE UNIT — 202

USER INFORMATION DATABASE — 281

| USER ID | USER NAME | HELD ITEMS | FIRST-TIME INFORMATION | SLEEP INFORMATION |
|---|---|---|---|---|
| #1A2B3C | AZX123 | ITEM A (10 PIECES) | ... 2020-04-01 7:00 ... | ... 2020-04-01 23:50 GO TO BED, 7:00 WAKE UP ... |
| #6D7E8F | KKLLMM | ITEM B (3 PIECES) | ... 2020-04-01 7:00 ... | ... 2020-04-01 23:00 GO TO BED, 7:00 WAKE UP ... |
| ... | ... | ... | ... | |

SERVER PROCESSING CAPACITY INFORMATION — 282

| UPPER LIMIT OF THE NUMBER OF CONCURRENT ACCESSES | PREDICTED VALUE OF THE NUMBER OF CONCURRENT ACCESSES AT EACH TIME (2020-04-01) | | | | | |
|---|---|---|---|---|---|---|
| | 7:00 | 7:01 | ... | 7:30 | 7:31 | ... |
| 5000 | 6000 USER ID: ... | 300 USER ID: ... | ... | 4000 USER ID: ... | 500 USER ID: ... | ... |

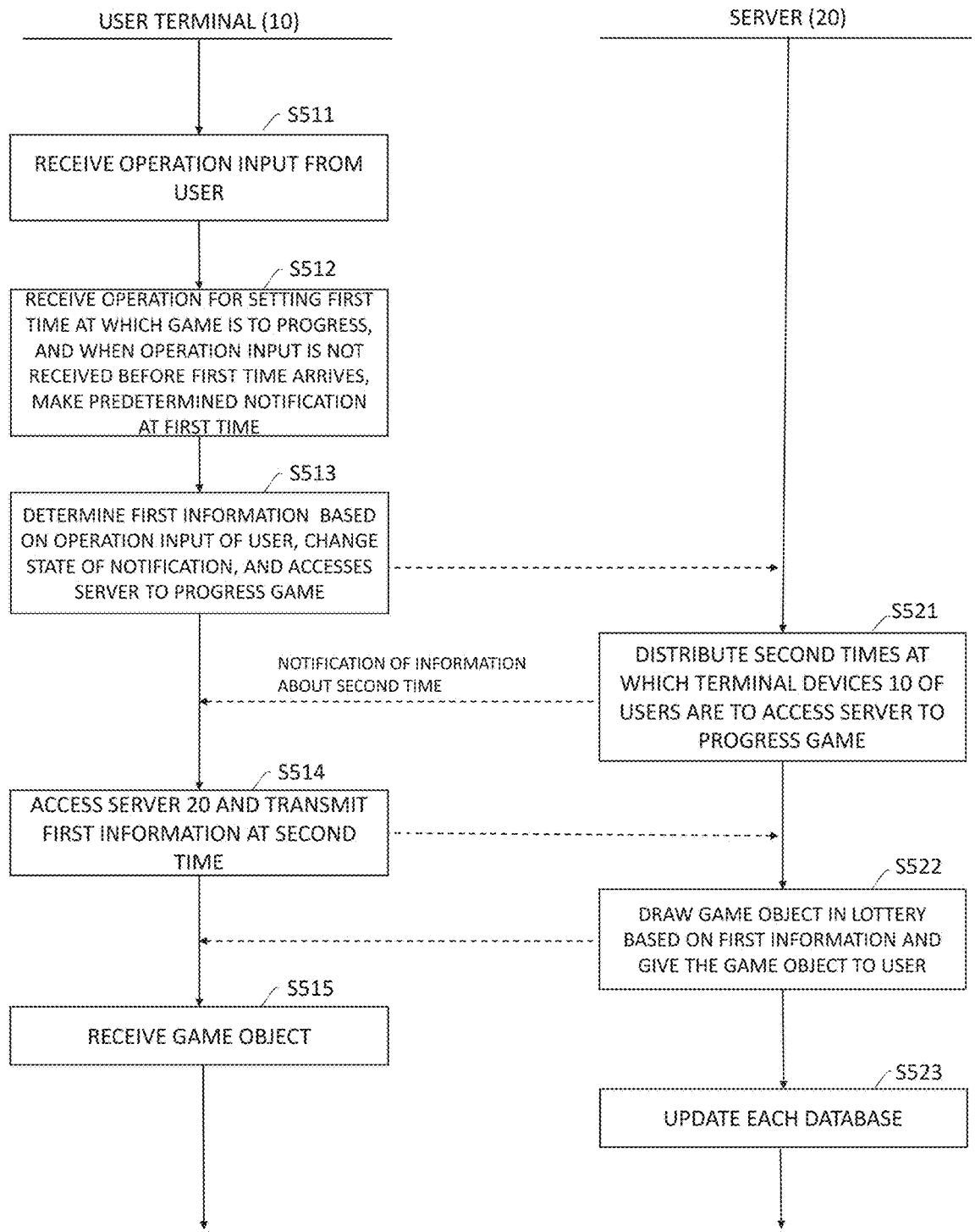

GAME PROGRAM, METHOD, AND INFORMATION PROCESSING DEVICE

CROSS-REFERENCE TO RELATED APPLICATIONS

This is a Bypass Continuation of International Application No. PCT/JP2021/018911, filed May 19, 2021, which claims priority to JP 2020-100989, filed Jun. 10, 2020, the entire contents of each are incorporated herein by its reference.

BACKGROUND

Field

The present disclosure relates to a game program, a method, and an information processing device.

Description of the Related Art

Technologies for measuring sleep are known. For example, by allowing a user to wear a wrist-watch type device, a stage of the user's sleep that is one of light sleep, deep sleep, and REM sleep is identified in accordance with an output result of a motion sensor mounted in the device. In accordance with this, changes in each stage of sleep over time can be recorded.

Reflecting data measured during a user's sleep in a game program is also performed. PTL 1 describes that, when it is determined that the user has woken up as a result of measuring the user's sleep, sleep information such as total sleep time is transmitted to a server and reflected in the game.

CITATION LIST

Patent Literature

[PTL 1] WO 2016/021235

SUMMARY

Technical Problems

However, users often set an alarm to wake up at the time the alarm rings. The alarm is often set for a convenient time such as 7:00 or 7:30. When sleep information is transmitted to the server all at once from the user terminals at such a time, access to the server will be excessively concentrated, which may have adverse effects on the operation of the game such as causing the server to go down or causing an abnormal situation to occur. Therefore, it is necessary to reserve huge server processing resources to withstand excessive access.

Accordingly, an object of the present disclosure is to provide a technology that maintains, for a game that receives information about sleep of users, enjoyment of the game without placing an excessive load on a server.
[Solutions to Problems]

According to one or more aspects of disclosed subject matter, a game program for being executed by a computer including a processor is provided. The game program causes the processor to execute the steps of: receiving an operation input from a user; setting a first time at which a game is to progress and making a predetermined notification at the first time when the operation input is not received before the first time arrives; changing a state of the notification based on the operation input of the user and accessing a server to progress the game; and distributing second times at which the computers of users are to access the server to progress the game.

According to one or more aspects of disclosed subject matter, a method causing a computer including a processor to execute a game is provided. The method causes the processor to execute the steps of: receiving an operation input from a user; setting a first time at which the game is to progress and making a predetermined notification at the first time when the operation input is not received before the first time arrives; changing a state of the notification based on the operation input of the user and accessing a server to progress the game; and distributing second times at which the computers of users are to access the server to progress the game.

According to one or more aspects of disclosed subject matter, an information processing device including a control unit is provided. The control unit executes the steps of: receiving an operation input from a user; setting a first time at which a game is to progress and making a predetermined notification at the first time when the operation input is not received before the first time arrives; changing a state of the notification based on the operation input of the user and accessing a server to progress the game; and distributing second times at which the computers of users are to access the server to progress the game.

According to the present disclosure, it is possible to maintain, for a game that receives information about sleep of users, enjoyment of the game without placing an excessive load on a server.

BRIEF DESCRIPTION OF DRAWINGS

FIG. 4 illustrates a data structure of user information database and server processing capacity database, which are stored in the server.

FIG. 5 is a flowchart illustrating processing of distributing second times at which users are actually to access the server to progress a game based on operation inputs of the users.

DETAILED DESCRIPTION

Hereinafter, embodiments of the present disclosure will be described with reference to the drawings. In the following description, the same parts are denoted by the same reference signs. Names and functions thereof are the same. Therefore, detailed description of them will not be repeated.

<1 Configuration Diagram of Entire Game System>

Figure 1:
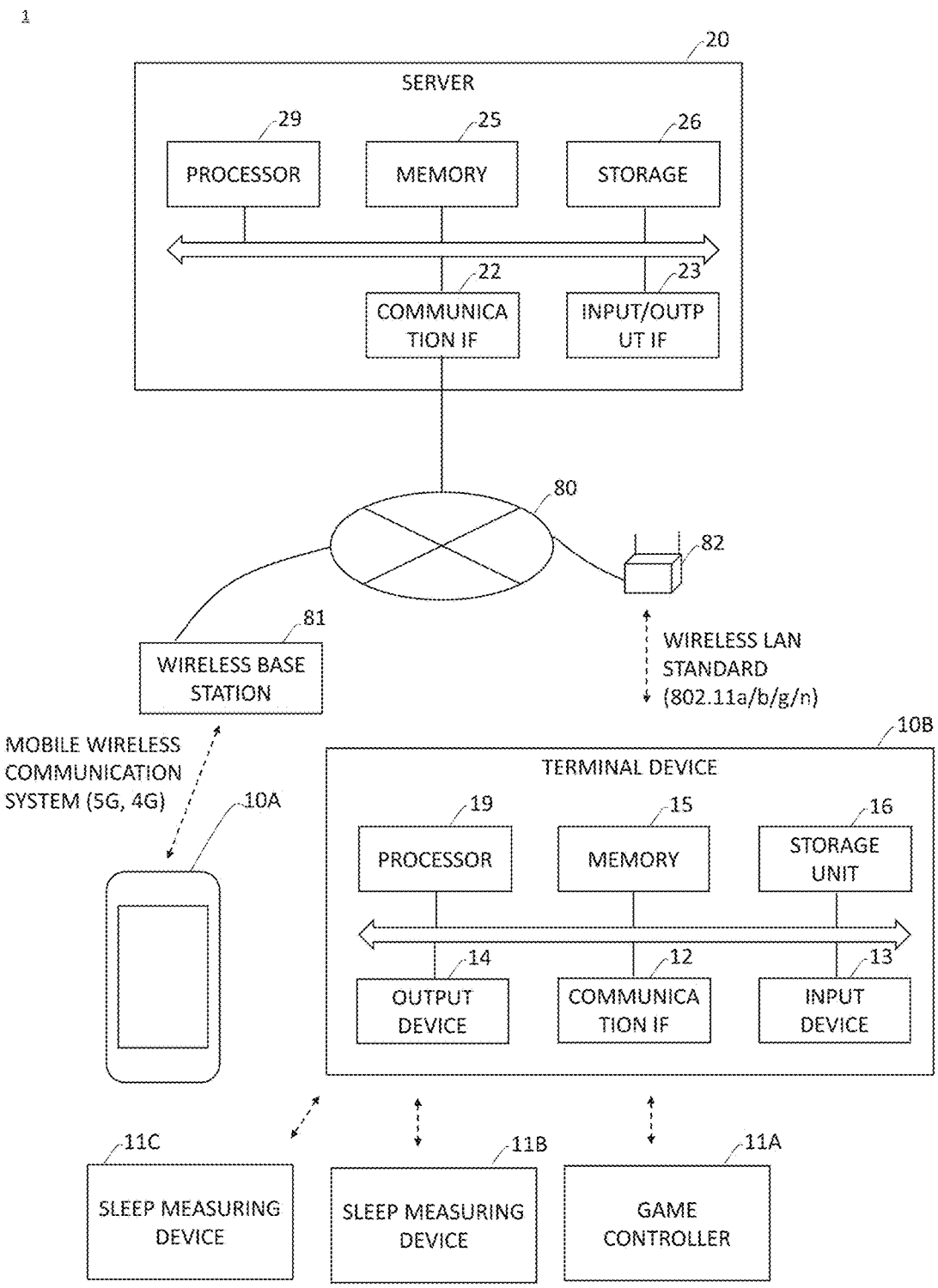
FIG. 1 is a diagram illustrating the entire configuration of a game system.

FIG. 1 is a diagram illustrating the entire configuration of a game system 1. In the game system 1, the server receives sleep information on each user to progress a game.

As illustrated in FIG. 1, the game system 1 includes a plurality of terminal devices (a terminal device 10A and a terminal device 10B are illustrated in FIG. 1; hereinafter they may be collectively referred to as a "terminal device 10") and a server 20. The terminal device 10 and the server 20 are communicatively connected through a network 80. In the present embodiment, each device (a terminal device, a server, or the like) can be perceived as an information processing device. In other words, an aggregation of such devices can be perceived as one "information processing device," and the game system 1 may be formed as an aggregation of a plurality of devices. A method for distributing a plurality of functions required for realizing the game system 1 according to the present embodiment to one or a plurality of pieces of hardware can be appropriately determined in consideration of the processing capacity of each piece of hardware and/or specifications required for the game system 1, and the like.

The terminal device 10 is a device that is operated by each user. The terminal device 10 is realized by a portable terminal such as a smartphone, a tablet, or the like corresponding to a mobile communication system. Other than that, the terminal device 10, for example, may be a stationary-type personal computer (PC), a laptop PC, or a game machine. In addition, the terminal device 10 may be configured to function as a head mounted display and, for example, may be configured to function as a head mounted display of a transmissive type, a non-transmissive type, or a see-through type. For example, the terminal device 10 may be configured to function as a portable terminal in the case of not functioning as a head mounted display and function as a head mounted display by being mounted in a goggle-type device. In such a case, the terminal device 10 can perform switching between a mode in which the terminal device functions as a portable terminal and a mode in which the terminal device functions as a head mounted display. In the case of the mode in which the terminal device functions as a head mounted display, the terminal device 10 detects a movement of a user's head part using a movement sensor built in the terminal device 10 and updates a displayed image of the display in accordance with a movement of the user's head part.

As represented as the terminal device 10B in FIG. 1, the terminal device 10 includes a communication interface (IF) 12, an input device 13, an output device 14, a memory 15, a storage unit 16, and a processor 19. The server 20 includes a communication IF 22, an input/output IF 23, a memory 25, a storage 26, and a processor 29. It should be appreciated that the functionality of the elements disclosed herein (e.g., the processor 19, the processor 20, etc.) may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. The processor may be a programmed processor which executes a program stored in a memory. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The terminal device 10 is communicatively connected to the server 20 through the network 80. The terminal device 10 is connected to the network 80 by communicating with a communication device such as a wireless base station 81 compliant with a communication standard such as 5G or Long Term Evolution (LTE), a wireless LAN router 82 compliant with a wireless local area network (LAN) standard such as Institute of Electrical and Electronics Engineers (IEEE) 802.11, or the like.

The communication IF 12 is an interface through which signals are input and output to enable the terminal device 10 to communicate with external devices. The input device 13 is an input device (for example, a pointing device such as a touch panel, a touch pad, a mouse, or the like, a keyboard, and the like) for receiving an input operation from a user. The output device 14 is an output device (a display, a speaker, or the like) used for presenting information to a user. The memory 15 is for temporarily storing a program, data processed by a program or the like, and the like and, for example, is a volatile memory such as a dynamic random access memory (DRAM). The storage unit 16 is a storage device for storing data and, for example, is a flash memory or a hard disc drive (HDD). The processor 19 is hardware used for executing a command set described in a program and is configured using an arithmetic operation device, a register, a peripheral circuit, and the like.

As illustrated, the terminal device 10 is connected to a game controller 11A in a wired manner or a wireless manner. A user can play a game by operating the game controller 11A. The terminal device 10 may be configured to be able to communicate with a plurality of game controllers 11A. For example, a plurality of users can play a game using one terminal device 10. In addition, the game controller 11A may have a structure of being able to be detachably attached to the terminal device 10. The game controller 11A may be one device that can be gripped by both hands of a user or may be configured using two devices respectively gripped by both hands of a user. For example, the game controller 11A may include a gyro sensor, an infrared sensor, or the like and detect a motion of a body (for example, a motion of a hand) of a user in a case in which the user grips the game controller 11A.

In addition, as illustrated, the terminal device 10 is connected to one or a plurality of sleep measuring devices in a wired manner or a wireless manner. Sleep measuring devices 11B and 11C are devices used for acquiring information about sleep of a user of the terminal device 10. FIG. 1 illustrates two sleep measuring devices including the sleep measuring device 11B and the sleep measuring device 11C. Hereinafter, a plurality of sleep measuring devices may be collectively referred to as "the sleep measuring device 11B and the like." The sleep measuring devices 11B and 11C, for example, are wearable devices of a wrist watch type, a ring type, an eye-mask type, or the like worn in a body of a user and include motion sensors such as gyro sensors or the like. In addition, the sleep measuring devices 11B and 11C may be devices that are placed in a mattress on which a user is sleeping, a headboard, or the like. Furthermore, the terminal device 10 and the sleep measuring device 11B or the sleep measuring device 11C may be the same device. In other words, the terminal device 10 may be configured to function also as a sleep measuring device.

There may be cases in which a user uses two or more sleep measuring devices at the same time. For example, a user may wear two sleep measuring devices of a wrist watch type or may use a smartphone as a sleep measuring device while being wearing a sleep measuring device of a wrist watch type. This makes it possible to detect a motion of the body of the user during sleep by using a gyro sensor or the like. By accumulating sensing results that have been sensed using various sensors during sleep of a user, it can be identified whether the user is during sleep, in a light sleep state, a deep sleep state, a REM sleep, a non-REM sleep, or the like. In this way, by identifying the waveform of a REM sleep or a non-REM sleep and the like, the quality of sleep of a user can be evaluated. For example, cycles of a REM sleep and a non-REM sleep in the case of a sleep of a good quality are set in advance, and the quality of a sleep of a user can be evaluated by comparing the waveform thereof with the waveforms of the REM sleep and the non-REM sleep at the time of the user sleeping.

The terminal device 10 detects that a user has gotten into bed (for example, has lied down horizontally on a bed) and has fell asleep after getting into bed based on an output of a motion sensor of the sleep measuring device 11B and the like. The terminal device 10 can determine whether a user had performed an input operation on the terminal device 10, whether a user had viewed information displayed on a display 132 of the terminal device 10, and the like before the user fell asleep after getting into bed. In other words, it can be determined whether or not a user going to go to bed has operated the terminal device 10 before falling asleep.

The sleep measuring devices assumed to be used in the game system 1 in advance are managed in the form of a so-called white list. In a case in which reception of data has been detected from the sleep measuring device 11B that is not managed by the game system 1, sleep information may be configured not to be received from the sleep measuring device 11B from which the server 20 cannot be identified, or subsequent processing may be performed using parameters used for the sleep measuring device 11B that cannot be identified or the like.

Differences in types of sleep measuring devices do not necessarily need to be difference in devices. In other words, even sleep measuring devices of the same device configuration may be managed as different sleep measuring devices in the game system 1 in accordance with types of software or applications used until transmission of sleep information to the server 20. For example, even in a case in which sleep information is detected using the same sleep measuring device 11B, in a case in which a sleep measuring application A is used for processing sleep information and a case in which a sleep measuring application B different from the sleep measuring application A is used for processing sleep information, the sleep measuring device can be managed as different "sleep measuring device IDs." In this way, by managing the sleep measuring device as different "sleep measuring device IDs" in accordance with a combination of a type of device as a device configuration and a used application, sleep information can be generated more flexibly, and as a result, enjoyment of a game according to a sleep state can be sufficiently exhibited.

The server 20 manages information on each user. The user information to be managed by the server 20 includes game characters held by each user, game items, an amount of virtual currency held by each user (including those given to the user free of charge and those given to the user for a fee), information on a first time at which a game is to progress set by the user, sleep information on the user measured by the sleep measuring device(s), and the like.

The server 20 manages information about the processing capacity of the server. The information about the processing capacity of the server to be managed includes an upper limit of the number of concurrent accesses to the server to be able to process, a predicted value of the number of concurrent accesses at each time, and the like. The predicted value of the number of concurrent accesses at each time is calculated based on the first time at which the game is to progress set by each user. The information about the processing capacity of the server may include information about a memory utilization threshold of the server, a CPU utilization threshold, and the like.

The communication IF 22 is an interface through which signals are input and output to enable the server 20 to communicate with external devices. The input/output IF 23 functions as an interface between an input device for accepting an input operation from a user and an output device for presenting information to a user. The memory 25 is used for temporarily storing programs, data processed by the programs, and the like and, for example, is a volatile memory such as a dynamic random access memory (DRAM). The storage 26 is a storage device used for storing data and, for example, is a flash memory, a hard disc drive (HDD), or the like. The processor 29 is hardware used for executing a command set described in a program and is configured of an arithmetic operation device, a register, a peripheral circuit, and the like.

<1.1 Configuration of Terminal Device 10>

Figure 2:
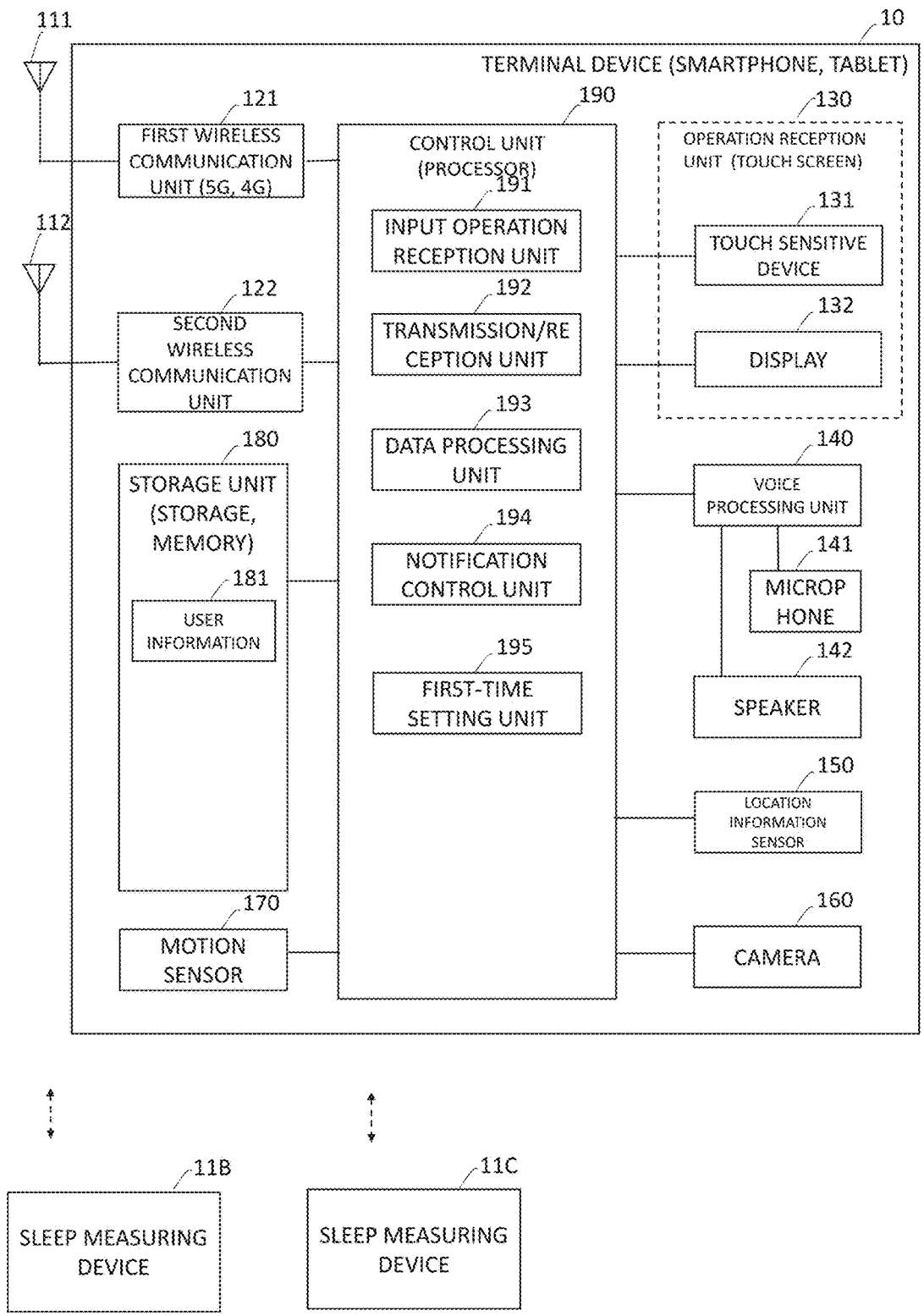
FIG. 2 is a block diagram of a terminal device which is a component of the game system according to one or more aspects of the disclosed subject matter.

FIG. 2 is a block diagram of the terminal device 10 which is a component of the game system 1 according to the first embodiment. As illustrated in FIG. 2, the terminal device 10 includes a plurality of antennas (an antenna 111 and an antenna 112), radio communication units respectively corresponding to the antennas (a first radio communication unit 121 and a second radio communication unit 122), an operation reception unit 130 (including a touch sensitive device 131 and the display 132), a voice processing unit 140, a microphone 141, a speaker 142, a location information sensor 150, a camera 160, a motion sensor 170, a storage unit 180, and a control unit 190. The terminal device 10 also has functions and configurations (for example, a battery for holding power, a power supply circuit for controlling the supply of power from the battery to each circuit, and the like) that are not particularly illustrated in FIG. 2. As illustrated in FIG. 2, respective blocks included in the terminal device 10 are electrically connected by a bus or the like.

The antenna 111 radiates a signal generated by the terminal device 10 as radio waves. Further, the antenna 111 receives radio waves from a space and provides a received signal to the first wireless communication unit 121.

The antenna 112 radiates a signal generated by the terminal device 10 as radio waves. Further, the antenna 112 receives radio waves from a space and provides a received signal to the second wireless communication unit 122.

The first wireless communication unit 121 performs modulation and demodulation processing for transmitting and receiving signals via the antenna 111 to allow the terminal device 10 to communicate with other wireless devices. The second wireless communication unit 122 performs modulation and demodulation processing for transmitting and receiving signals via the antenna 112 to allow the terminal device 10 to communicate with other wireless devices. The first wireless communication unit 121 and the second wireless communication unit 122 are communication modules including a tuner, a received signal strength indicator (RSSI) calculation circuit, a cyclic redundancy check (CRC) calculation circuit, a high frequency circuit, and the like. The first wireless communication unit 121 and the second wireless communication unit 122 perform modulation, demodulation, and frequency conversion on wireless signals transmitted and received by the terminal device 10, and provide the received signals to the control unit 190.

The operation reception unit 130 has a mechanism for receiving an input operation from the user. Specifically, the operation reception unit 130 is configured as a touch screen, and includes the touch sensitive device 131 and the display 132. The touch sensitive device 131 receives an input operation from the user of the terminal device 10. The touch sensitive device 131 uses the capacitive touch panel, for example, to detect a contact position of the user on a capacitive touch panel. The touch sensitive device 131 outputs a signal indicating the contact position of the user detected by the touch panel to the control unit 190 as an input operation.

The display 132 displays data such as an image, video, and text according to the control of the control unit 190. The display 132 is realized by, for example, a liquid crystal display (LCD) or an organic electro-luminescence (EL) display.

The voice processing unit 140 performs modulation and demodulation on a voice signal. The voice processing unit 140 modulates a signal provided from the microphone 141, and provides the resulting modulated signal to the control unit 190. The voice processing unit 140 also provides the voice signal to the speaker 142. The voice processing unit 140 is realized as, for example, a processor for voice processing. The microphone 141 receives a voice input and provides a voice signal corresponding to the voice input to the voice processing unit 140. The speaker 142 converts the voice signal provided from the voice processing unit 140 into a voice and outputs the voice to the outside of the terminal device 10.

The location information sensor 150 is a sensor that detects a position of the terminal device 10, and is, for example, a global positioning system (GPS) module. The GPS module is a reception device that is used in a satellite positioning system. The satellite positioning system receives signals from at least three or four satellites, and detects a current position of the terminal device 10 having the GPS module mounted thereon, on the basis of the received signals. For example, in the game system 1, in a case in which locations of users who are registered as friends are configured to be able to be referred to, the terminal device 10 can display a list of friends present near a user on the display 132.

The camera 160 is a device for receiving light using a light reception element and outputting the light as a captured image. The camera 160 is, for example, a depth camera capable of detecting a distance from the camera 160 to an object to be captured.

The motion sensor 170 includes an acceleration sensor, an angular velocity sensor, and the like, detects a movement of the terminal device 10, and outputs a sensing result. For example, by placing the terminal device 10 in a mattress of a bed on which a user sleeps or the like, in a case in which a user during sleep is moving on the mattress, the corresponding motion can be detected. By using the sensing result, it can be identified whether a user is sleeping or is awoken, and whether the user during sleep is in a light sleep, a deep sleep, a REM sleep, or a non-REM sleep, and the like.

The storage unit 180 is configured of, for example, a flash memory, and stores data and programs to be used by the terminal device 10. In a certain phase, the storage unit 180 stores user information 181.

The user information 181 is information on each user in a game based on a game program. The information on the user includes information for identifying the user, the name of the user, game items held by the user, information on a first time at which the game is to progress set by the user, and sleep information on the user measured by the sleep measuring device 11B and the like.

The terminal device 10 receives sensing results of the sleep measuring device 11B and the like by communicating with the sleep measuring device 11B and the like using short-range radio communication such as Bluetooth (a registered trademark), Wi-Fi, or the like. The sleep measuring device 11B and the like may transmit sensing results to the server 20 without using short-range radio communication in correspondence with communication standards of a mobile communication system such as 5G. The terminal device 10 may receive sensing results acquired by the sleep measuring device 11B and the like from the server 20 that has received the sensing results from the sleep measuring device 11B and the like, generate sleep information using the received sensing results, and store the generated sleep information.

The control unit 190 controls the operation of the terminal device 10 by reading the program stored in the storage unit 180 and executing instructions included in the program. The control unit 190 is, for example, an application processor. The control unit 190 operates in accordance with a program, thereby exhibiting functions of an input operation reception unit 191, a transmission/reception unit 192, a data processing unit 193, a notification control unit 194, and a first-time setting unit 195.

The input operation reception unit 191 performs processing for receiving an input operation of the user on an input device such as the touch sensitive device 131. The input operation reception unit 191 discriminates a type of operation, such as whether an operation of the user is a flick operation, a tap operation, a drag (swipe) operation, or the like based on information of coordinates at which the user touches the touch sensitive device 131 with a finger or the like.

The transmission/reception unit 192 performs processing for enabling the terminal device 10 to transmit/receive data to/from external devices such as the server 20, the game controller 11A, the sleep measuring device 11B, and the like in accordance with a communication protocol.

The data processing unit 193 performs a calculation on data received by the terminal device 10 according to a program, and performs processing for outputting a calculation result to a memory or the like.

The notification control unit 194 performs processing of presenting information to the user. The notification control unit 194 performs processing of causing the display 132 to display a display image, processing of causing the speaker 142 to output a voice, processing of causing the camera 160 to generate vibration, and the like.

The first-time setting unit 195 receives an operation from the user to set a first time at which the game is to progress. For example, the first-time setting unit is an alarm setting unit, and the user sets a scheduled wake-up time as a first time. At the first time, the terminal device 10 sounds an alarm, and when the user stops the alarm, the terminal device 10 determines that the user has woken up, and generates sleep information to be transmitted to the server 20. When receiving the sleep information from the terminal device 10, the server 20 progresses the game.

The alarm setting unit referred to here may be implemented by a program that each device (the terminal device 10, the server 20) included in the game system 1 provides the game to the user. In a case where the alarm setting unit is implemented by a program that runs on the server 20, the user may be able to operate the alarm setting unit of the server 20 via the terminal device 10. In this way, the user sets the first time in the game system 1 to progress the game. For example, the alarm setting unit may be installed in the terminal device 10 and embedded in an application that can be linked with the game system 1. In this case, instead of an alarm function provided as a function of the operating system (OS) of the terminal device 10, the user can set the first time by using the alarm setting unit included in an application that the terminal device 10 provides the game in the game system 1 to the user. The game system 1 receives an operation related to the first time from the alarm setting unit to progress the game.

<1.2 Functional Configuration of Server 20>

Figure 3:
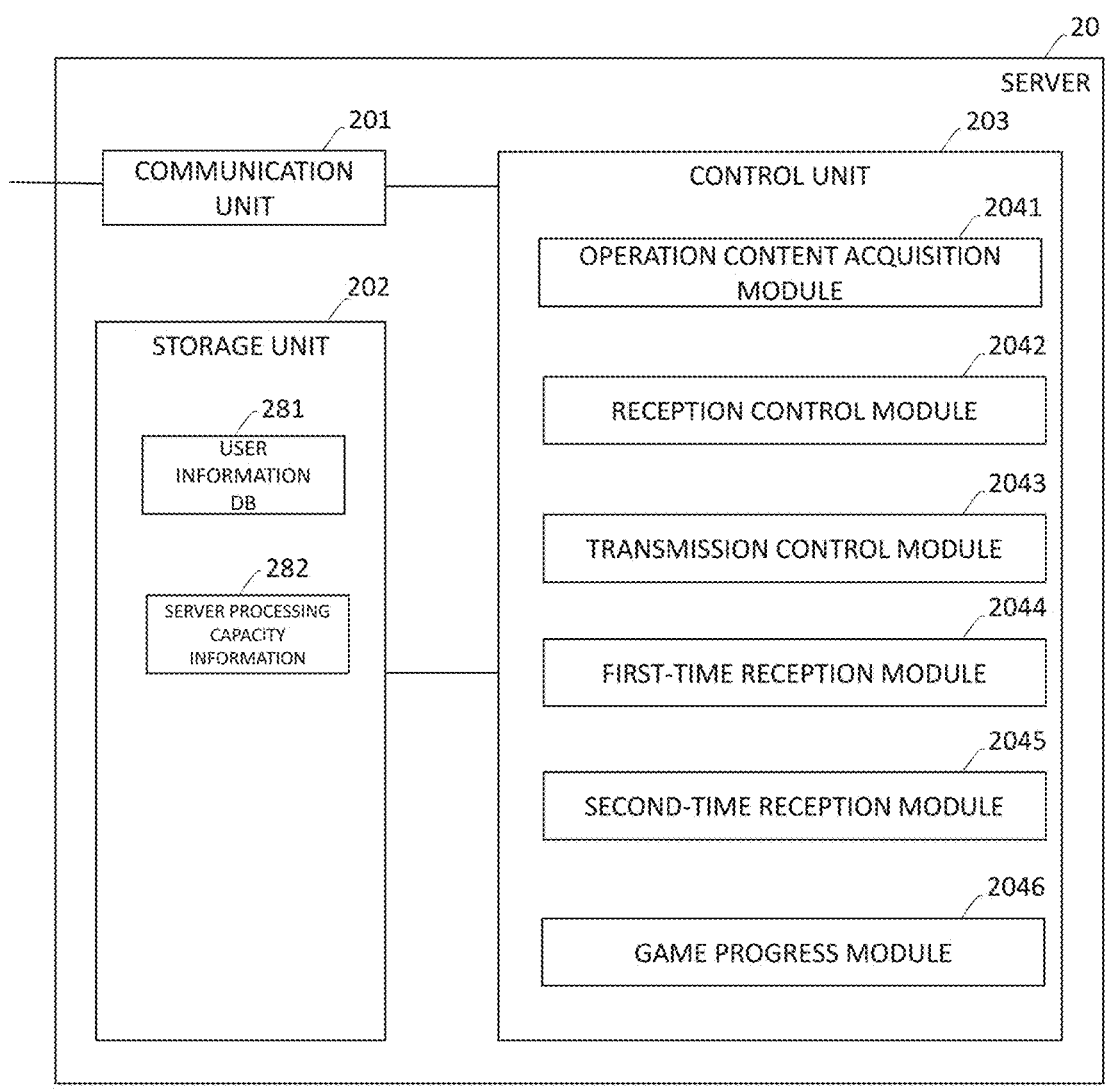
FIG. 3 is a diagram illustrating a functional configuration of a server.

FIG. 3 is a diagram illustrating a functional configuration of the server 20. As illustrated in FIG. 3, the server 20 exhibits functions of a communication unit 201, a storage unit 202, and a control unit 203.

The communication unit 201 performs processing for enabling the server 20 to communicate with external devices.

The storage unit 202 stores data and programs used by the server 20. The storage unit 202 stores a user information database 281, server processing capacity information 282, and the like.

The user information database 281 is a database used for storing information of each user in a game based on a game program. Details thereof will be described below.

The server processing capacity information 282 is information on the processing capacity of the server for progressing the game. Details will be described below.

The control unit 203 exhibits functions represented as various modules by the processor of the server 20 performing processing according to a program.

An operation content acquisition module 2041 acquires operation content of the user. The operation content acquisition module 2041, for example, acquires a game unit that has been specified by the user as a target for game play and the like as operation content of the user.

A reception control module 2042 controls processing for the server 20 to receive a signal from an external device in accordance with a communication protocol.

A transmission control module 2043 controls processing for the server 20 to transmit a signal to an external device in accordance with a communication protocol.

A first-time reception module 2044 receives from the terminal device 10 information about the first time at which the game is to progress set by each user. For example, assume that a user has set a scheduled wake-up time (alarm activation time) as a first time. The terminal device 10 operates an alarm based on the alarm activation time, receives an operation input of the user, and transmits first information to the server 20 in response to the operation input. The server 20 progresses the game based on the first information. In other words, the server 20 receives information to progress the game from the terminal device 10 of each user based on an operation input of the user at the alarm activation time set by the user.

The operation input referred to here is an operation to determine the first information, for example, an operation for the user to wake up and then end the sleep measurement. The operation input may be an operation to stop an alarm that is sounding, or an operation for wake-up before the alarm sounds and then ending the sleep measurement. When the operation input is not received before the first time arrives, an alarm sounds at the first time. When receiving the operation input before the first time arrives, the terminal device 10 ends the sleep measurement without sounding an alarm at the first time.

The first information referred to here is chronological information, for example, sleep information on the user. The terminal device 10 determines the sleep information by receiving an operation input for wake-up and ending the sleep measurement from the user. Then, the terminal device 10 transmits the determined sleep information to the server 20, and the server 20 draws an object in a lottery based on the determined sleep information and gives the object to the user.

A second-time determination module 2045 determines a second time at which the game is to progress on the server 20 based on an operation input of the user. The second-time determination module 2045 determines a second time for each user so as to distribute the timings at which the terminal devices 10 of users are to actually access the server 20. This distributes the timings of access from the terminal devices 10 to the server 20. In the present embodiment in which the sleep information of each user is received to progress the game, the second time is the time that triggers the progress of the game. For example, the second time may be "the time of an operation input when the terminal device 10 receives the operation input of the user before an alarm sounds (for example, within a predetermined time period before the alarm sounds)." The user may wake up and operate the terminal device 10 before the alarm sounds. Accordingly, the second time may be "the time at which the user stops the alarm to determine the sleep information." The server 20 progresses the game being played by the user based on "the time at which the user stops the alarm to determine the sleep information." The second time may be "the time at which the terminal device 10 transmits aggregated pieces of sleep information to the server 20." The second time may be "the time at which the server 20 receives the sleep information from the terminal device 10," and the server 20 may progress the game based on these times. In the following description, the second time will be described based on the time when the server receives the sleep information.

The second time may arrive after the first time. At the first time, the terminal device 10 sounds an alarm to receive an operation input from the user. The terminal device 10 generates information for progressing the game in response to receiving the operation input. At the second time, the terminal device 10 transmits information for progressing the game to the server 20 to progress the game. "(b) distributing the first times set for the users," will be described later, means that the second time is substantially the same as the first time.

For example, the terminal device 10 is a device that can measure sleep of the user, and the server 20 performs lottery drawing processing based on the sleep information on the user. Assume that the user has set a scheduled wake-up time (alarm activation time) as a first time. In this case, the terminal device 10 sounds the alarm at the first time. The terminal device 10 receives an operation input to stop the alarm from the user. The terminal device 10 determines that the user has woken up in response to the operation input. The terminal device 10 determines the sleep information to be transmitted to the server 20 based on the operation input (in response to determining that the user has woken up). The terminal device 10 does not communicate with the server 20 at the first time but communicates with the server 20 at a second time after the first time to transmit the determined sleep information. The server 20 performs lottery drawing processing based on the sleep information.

In a certain aspect, the second-time determination module 2045 determines the second time by using information about the first time. For example, in a case where the number of users who have set the same first time exceeds an upper limit of the number of concurrent accesses to the server, the second-time determination module 2045 predicts that concentration of access to the server will occur at the first time, and randomly delays the first time set by each of the users, thereby determining a second time at which the terminal device 10 of each user actually is to access the server to progress the game.

The server 20 may predict a concentration of access that will occur at a predetermined time based on past history information, not based on information about the first time actually set by each user, and determine a second time that is to be set by the terminal device 10 of each user such that actual access times of the terminal devices 10 of the users are distributed. For example, assume that the first time is the alarm activation time. From the past history information, the server 20 extracts a trend that "there is a large number of users who set an alarm for weekdays 7:00 to progress the game." The server 20 predicts that a concentration of access may occur on weekdays at 7:00, determines an access time of the terminal device 10 of each user such that actual access times of the terminal devices 10 of the users who have set the first time as 7:00 are distributed, and causes the terminal device 10 of each user to hold information on the corresponding access time. The terminal device 10 may hold history information of past accesses to the server 20, and each terminal device 10 may predict a time at which a concentration of access will occur. Each terminal device 10 may predict a time at which a concentration of access will occur, and randomly determine a time at which the terminal device 10 is to access the server 20 so as to avoid that concentration.

The second time may be determined such that the progress of the game is not affected around the second time. For example, in the present embodiment in which the sleep information on each user is received to progress the game, similarly, in a case where for two users who have woken up by an alarm set for 7:00 (first time), their respective actual access times (second times) are randomly delayed so that they are set to times delayed by 1 second and 3 seconds from 7:00, respectively, pieces of sleep information for the wake-up time set to 7:00 are aggregated to progress the game. For "(A) distributing the first times set for the users," will be described later, since the second time is substantially a time set by the user to determine sleep information, the progress of the game may be affected around the second time.

A game progress module 2046 makes a communication between the server 20 and the terminal device 10 to progress the game being played by each user based on the sleep information on the user received from the terminal device 10 of the user. For example, the game progress module 2046 draws a game object to be determined in a lottery, such as a character or an item to appear in the game being played by the user, to progress the game being played. The determined character, item, or the like may appear in the game being played instead of being held by each user. This makes it possible for the user to have an experience such as discovering a new game character based on the sleep information. In addition, the game progress module 2046 may randomly draw a game object such as a character or an item to give the game object to the user in a lottery. For example, the game progress module 2046 receives sleep time information and sleep quality information as sleep information on each user from the terminal device 10 at the second time set in the terminal device 10 of the user and draws an item or the like to be given in a lottery based on the sleep information on the user. Here, the drawing algorithm differs according to the sleep information on each user, for example, changing a drawing table used in the drawing and the number of drawing, and thus the progress of the game at wake-up is changed, so that it is possible to provide enjoyment at wake-up to the user.

<2 Data Structure>

FIG. 4 illustrates a data structure of the user information database 281 and the server processing capacity information 282, which are stored in the server 20.

As illustrated in FIG. 4, each record in the user information database 281 includes items, for example, "user ID," "user name," "held items," "first-time information," and "sleep information."

The item "user ID" is information for identifying each user.

The item "user name" is a name set by the user.

The item "held items" indicates information about a game item held by the user. For example, a game item is drawn in a lottery by the server 20 based on sleep information of each user and is given to the user. That item also includes information on the type of each game item, the number of game items, and the like.

The item "first-time information" is information about the time at which the game is to progress set by each user. For example, the first time is a scheduled wake-up time (alarm activation time) set by the user. This item also includes date information of each first time.

The item "sleep information" is information about the sleep state of each user, which is measured by the sleep measuring device. The sleep information includes information such as date information, bedtime, wake-up time, and quality of sleep.

Each record of the server processing capacity information 282 includes items "upper limit of the number of concurrent accesses" and "predicted value of the number of concurrent accesses at each time."

The item "upper limit of the number of concurrent accesses" is an upper limit of the number of concurrent accesses to the server to be able to process the game. If the actual number of concurrent accesses exceeds the upper limit due to a concentration of access, the progress of the game may be adversely affected, such as increasing the load on the server and slowing down the response. Therefore, resources such as computing power of the server may be variably increased or decreased based on a predicted value of the number of accesses.

The item "predicted number of concurrent accesses at each time" is the number of concurrent accesses at each time, predicted based on the first time set by each user. For example, the user sets a scheduled wake-up time (alarm activation time) as a first time every minute. The server 20 predicts that the number of concurrent accesses from each terminal device 10 to the server 20 at each time is the same as the number of users who have set that time as a first time (alarm activation time). The item also includes the user IDs of users who have set each time as the first time.

When a predicted value of the number of concurrent accesses at a predetermined time (for example, time 7:00 in FIG. 4) exceeds the upper limit of the number of concurrent accesses to the server, the server 20 determines that the number of accesses at that time exceeds the processing capacity of the server and thus it is necessary to distribute the actual access times of users. In this case, the server 20 distributes second times at which the users actually access the server to progresses the game, based on an operation input of each user. For example, the server 20 determines the second times by randomly delaying the first times.

Although the upper limit of the number of concurrent accesses has been described above as an example of the processing capacity of the server, the processing capacity of the server is not limited to this example. For example, a memory usage rate threshold of the server, a CPU usage rate threshold, or the like may be used as a reference for the processing capacity of the server.

<Operation>

FIG. 5 is a flowchart illustrating processing of distributing second times at which users are actually to access the server to progress the game, and progressing the game. The terminal device 10 communicates with the server 20 to transmit the sleep information on the user to the server 20 and to reflect the sleep information in the game.

In step S511, the terminal device 10 receives an operation input from the user. For example, the operation input is an operation for the user to stop the alarm to determine the sleep information.

In step S512, the terminal device 10 receives from the user an operation for setting a first time at which the game is to progress, and when an operation input is not received before the first time arrives, the terminal device 10 makes a predetermined notification at the first time. For example, the user sets a scheduled wake-up time (alarm activation time) as a first time, and when an operation input indicating that the user has woken up is not received before the first time arrives, the alarm sounds at the first time.

In step S513, the terminal device 10 determines the first time based on the operation input of the user, changes the state of the notification, and accesses the server to progress the game. For example, when the terminal device 10 receives an operation input to stop the alarm from the user, the terminal device 10 stops the operation of the alarm, ends the measurement of sleep information on the user, and aggregates pieces of sleep information used for lottery drawing processing.

In step S521, the server 20 distributes second times at which the computers of users are to access the server to progress the game. Specifically, the server 20 distributes second times by one of the following processing.

(a) Processing of Delaying First Time The server 20 distributes second times in such a manner that the timings at which a plurality of users are to access the server are distributed after operation inputs of the users are received.

For example, the server 20 randomly delays the first time set by each user to determine a second time. The first time is a scheduled wake-up time (alarm activation time) set by the user, and the server 20 predicts the number of concurrent accesses at each time based on the number of users who have set each time as the alarm activation time. The server 20 compares the predicted value of the number of concurrent accesses at each time with the upper limit of the number of concurrent accesses to the server to identify the first time for which the predicted value of the number of concurrent accesses exceeds the upper limit of the number of concurrent accesses, and randomly delays the first time to determine a second time. The terminal device 10 does not perform communication processing with the server 20 at the time when the user stops the alarm, but waits for a while and then performs communication processing with the server 20 at the second time. At that time, in order to aggregate pieces of sleep information to be transmitted to the server 20 through the communication processing, the terminal device 10 may wait for a while to perform the aggregation processing.

Alternatively, the terminal device 10 may first aggregate pieces of sleep information and wait for the arrival of the second time to communicate with the server 20.

For example, when the number of users who have set the alarm activation time (first time) for 7:00 exceeds the upper limit of the number of concurrent accesses to the server, the server 20 predicts that a concentration of access will occur at 7:00, determines a time randomly delayed by 0 to 5 seconds from 7:00 as the actual access time (second time) for each user to distribute access times of the users.

The terminal device 10 may output at least one of a video, a still image, and sound in a period of time from the first time to the second time. For example, after the user turns off the alarm in response to the alarm sounding at 7:00, the terminal device 10 plays back a video to the user without communicating with the server 20 in a period of time until the second time. The terminal device 10 may output at least one of a video, a still image, and sound according to the length of a period of time from the first time to the second time. For example, the terminal device 10 plays back a video with a length of 3 seconds for a user with a wait time of 3 seconds, and plays back a sound with a length of 5 seconds for a user with a wait time of 5 seconds.

In this way, the time at which the game is to progress set by each user is ascertained in advance to predict a concentration of access to the server at that time, and the time at which the game is to progress is randomly delayed, so that it is possible to distribute the times at which users are actually to access the server to progress the game. In a wait time between the time at which the game is to progress and the time at which the server is actually to be accessed to progress the game, a content such as a video is played back to the user, so that the user does not just have to wait but utilize time effectively, and thus to maintain enjoyment of the game. In the above, the second time is set by randomly delaying the first time for each user. However, not limited to delaying, some users may set a second time earlier than the first time, which is a time (first time) set as an alarm by each user, to distribute the timings at which the terminal devices 10 of users are to access the server 20.

(b) Processing of Distributing First Times Set for Users The server 20 sets a first time for each terminal device 10 based on the result of distributing first times at which a predetermined notification is to be made for users.

For example, the first time is a scheduled wake-up time (alarm activation time) set by the user, and when a user sets the alarm activation time, the server 20 receives an operation of specifying the alarm activation time from the user. If the time specified by the user is predicted to be a time at which a concentration of access is likely to occur, the server 20 presents as a recommended alarm activation time, a time that is close to the time specified by the user and is also a predicted time at which a concentration of access will not occur, to the user of the terminal device 10. The terminal device 10 sets the recommended alarm activation time as a first time, presents the setting result to the user, and receives an operation from the user to approve the change of the first time. The terminal device 10 may receive an operation for setting the recommended alarm activation time as a first time from the user.

For example, assume that the user specifies 7:00 as a desired alarm activation time (first time). In this case, from information on the alarm activation time specified by each user, the server 20 predicts that a concentration of access to the server will occur at 7:00, and present time 6:59 or 7:01 as a recommended alarm activation time to the user.

In a case where the user sets a candidate time as a first time to progress the game, the server 20 executes game progress differently from a case where the user does not set the candidate time as a first time. For example, a case where a candidate time is set as a first time to progress the game may be changed compared to a case where another time is set as a first time, for example, may execute game progress more favorable to the user. The game progress more favorable to the user means, for example, giving a benefit such as giving a game object, making it possible to play a predetermined game unit (also called quest), and changing the degree of difficulty of a predetermined game unit (reducing the degree of difficulty to make it easier to complete, thus making it easier to obtain rewards for completing the game). For example, in a case where time 6:59 or 7:01 is presented as a recommended alarm activation time to the user; 6:59 or 7:00 is set as an alarm activation time; and the server 20 is then accessed, the server 20 notifies the user that a benefit will be given (for example, a game object such as an item of high rarity will be given).

In addition, the terminal device 10 senses the sleeping state of the user. When the user sets a first time based on the distributed results, the terminal device 10 makes a predetermined notification based on the result of sensing the sleeping state of the user even though the first time has been set. When receiving an operation input from the user in response to a predetermined notification, the terminal device 10 accesses the server 20.

For example, the terminal device 10 sounds an alarm in a period of time during which the user is likely to awake (in light sleep), based on the result of measuring the sleep state of the user even though the alarm activation time has been set. When receiving an operation to stop the alarm from the user, the terminal device 10 accesses the server 20.

In this way, giving gaming nature to the setting of a time at which the game is to progress makes it possible to increase enjoyment. In addition, presenting a time at which a concentration of access is unlikely to occur prompts the user to set that time as the access time, making it possible to prevent a concentration of access to the server from occurring.

(c) Processing of Setting Time at Which Treasure Box Is to Be Opened as Second Time The terminal device 10 transmits second information indicating that an operation input of the user has been received to the server 20. The server 20 determines a wait time that may be different for each of the users who have received the second information, and transmits the determined wait time to the terminal device 10 of each user to present the wait time.

The terminal device 10 updates the information indicating the wait time over time and presents the resulting information to the user, and is not allowed to receive a predetermined operation to access the server 20 from the user until the wait time has elapsed. In response to the elapsed time, the terminal device 10 is allowed to receive the predetermined operation to access the server 20 from the user.

For example, the first time is a scheduled wake-up time (alarm activation time) set by the user. After the user wakes up at the first time and then stops the alarm, the terminal device 10 transmits the second information (indicating that the user has woken up) instead of transmitting the first information (sleep information) to the server 20. The server 20 then displays, to the user, an item (such as a treasure box) associated with a game object that is available in the game progress. The item (treasure box) is information indicating the right to be given some game object determined without using the first information when receiving an operation to open the treasure box from the user. The time at which each user is to open a treasure box is set as a second time. Specifically, when each user opens a treasure box, the terminal device 10 accesses the server 20, transmits sleep information, and performs lottery drawing processing for a game object. In the information indicating the right, a period of time during which an operation to open a treasure box is not allowed to be received from the user is set. The terminal device 10 displays a timing at which an operation to open a treasure box is to be received from the user after the period expires. The terminal device 10 sets the timing at which the user is allowed to open the treasure box, and displays the remaining time until that timing arrives.

The terminal device 10 may notify the server 20 in response to the user's operation to stop the alarm based on the first time, and the server 20 may then give the user a treasure box indicating the right. Specifically, at the first time, the server 20 does not draw a game object in a lottery, gives a treasure box indicating the right; the terminal device 10 receives an operation to open the treasure box from the user and transmits to the server 20 a notification indicating that the operation has been received; and the server 20 draws a game object in a lottery.

Objects have different appearances depending on their rarity. For example, treasure boxes normally include silver or gold treasure boxes and are associated with different rarities. At the first time, the server 20 normally determines a type of silver or gold treasure box by lottery drawing without using sleep information, and gives the corresponding user the determined type of treasure box. After that, at the timing when the user opens the treasure box, a game object is drawn in a lottery based on the sleep information and the information on the type of the treasure box.

In this way, instead of drawing a game object in a lottery based on the sleep information at the first time, which is processing that places a load on the server, actual times at which users are to access the server are distributed in such a manner that each user is given an object such as a treasure box and a timing at which the user is to open the treasure box is set as an actual access time; and a game object is drawn in a lottery based on the sleep information at the timing when the treasure box is opened. This makes it possible to reduce the communication load between the terminal devices and the server. In addition, objects to be given have different aspects, so that it is possible to make the user have a sense of expectation and increase enjoyment.

(d) Processing of Playing Different Types of Sounds as Alarm Sounds According to Time The terminal device 10 makes a specific notification according to the elapsed time from the first time in response to a predetermined notification based on the arrival of the first time. The server 20 gives a benefit to the user when receiving an operation input for accessing the server to progress the game from the user based on the timing of making the specific notification.

For example, when the terminal device 10 sounds a first type of alarm sound at the first time so as to prompt the user to stop the alarm at the second time, the terminal device 10 sounds a second type of alarm sound (different from the first type of alarm sound) based on the second time while continuing to sound the first type of alarm sound. In this state, receiving an operation to stop the second type of alarm sound is received, the user is set to be more favorable to the user than receiving an operation to stop the first type of alarm sound.

Compared to the first type of alarm sound, the second type of alarm sound may be a sound to prompt the user to stop the alarm at a specific timing. For example, the first type of alarm sound may be a specific continuous sound to be output (for example, a sound to be output for a certain period of time, such as "jiri-ri-ri-ri"), while the second type of alarm sound may be an intermittent sound (for example, a sound to be output at a specific timing from a silent state). For example, the first time is a scheduled wake-up time (alarm activation time) set by the user, and at the first time, the terminal device 10 sounds the first type of alarm sound, and accesses the server 20 at the timing when the user stops the alarm sound. The second type of alarm sound is, for example, a sound composed of sounds different from the first type of alarm sound, and includes, for example, a "picon" sound and other sounds. When the terminal device 10 receives an operation to stop the second type of alarm sound from the user during play back of the alarm, the server 20 is accessed by the terminal device 10 at that timing, draws a game object in a lottery, and gives a game object more favorable to the user (for example, a rare item) than in the case of receiving an operation to stop the first type of alarm sound. In addition, as for the first type of alarm sound and the second type of alarm sound, both the first type of alarm sound and second type of alarm sound may be voices of specific game characters (for example, a cry of a virtual character), while the content of the voice (message or the like) may be different between the first type and the second type, or the second type of sound may be a voice indicating the occurrence of a game unit such as a quest (indicating that an event giving an opportunity to fight against a specific character has occurred (for example, a strong enemy "XX" has appeared) and the like).

The timing at which a predetermined sound is to be played back by voice for each user is made different for each user. For example, for users who have set the alarm activation time to 7:00, an alarm sound with a "picon" sound appearing in the first half is played back for some users, while an alarm sound with a "picon" sound appearing in the second half is played back for the other users.

In this way, the sound is played back at the time at which the game is to progress set by the user, and the server is actually accessed in accordance with the timing at which the user's operation to stop the sound is received, so that it is possible to distribute actual times at which users are to access the server. In addition, by prompting the user to stop the play back of the predetermined sound, giving gaming nature to the setting of a time at which the game is to progress makes it possible to increase enjoyment.

In step S521, the server 20 distributes second times at which the terminal devices 10 of the users are to access the server to progress the game by any of the processing operations described above, and then notifies the terminal devices 10 of the users of information about the second times. The terminal device 10 of each user holds the information of the corresponding second time notified from the server 20. This makes it possible for the terminal device 10 to perform processing based on the second time (such as transmission of sleep information).

In step S514, the terminal device 10 accesses the server 20 and transmits the first information to the server 20 at the second time. For example, the terminal device 10 communicates with the server 20 to transmit the sleep information on the user to the server 20 at a second time randomly delayed by seconds from the first time.

In step S522, the server 20 draws a game object (item or the like) in a lottery based on the first information and gives the game object to the user. For example, the server 20 draws a game object in a lottery based on the total sleep time of the user, and the more favorable item is given to the user, the longer the total sleep time.

At step S515, the server 20 receives the item given at step S522.

In step S523, the server 20 updates each database.

By the series of processing described above, for a game that receives information about sleep of users, enjoyment of the game is maintained without placing an excessive load on a server.

<4 Screen Example>

Figure 6:
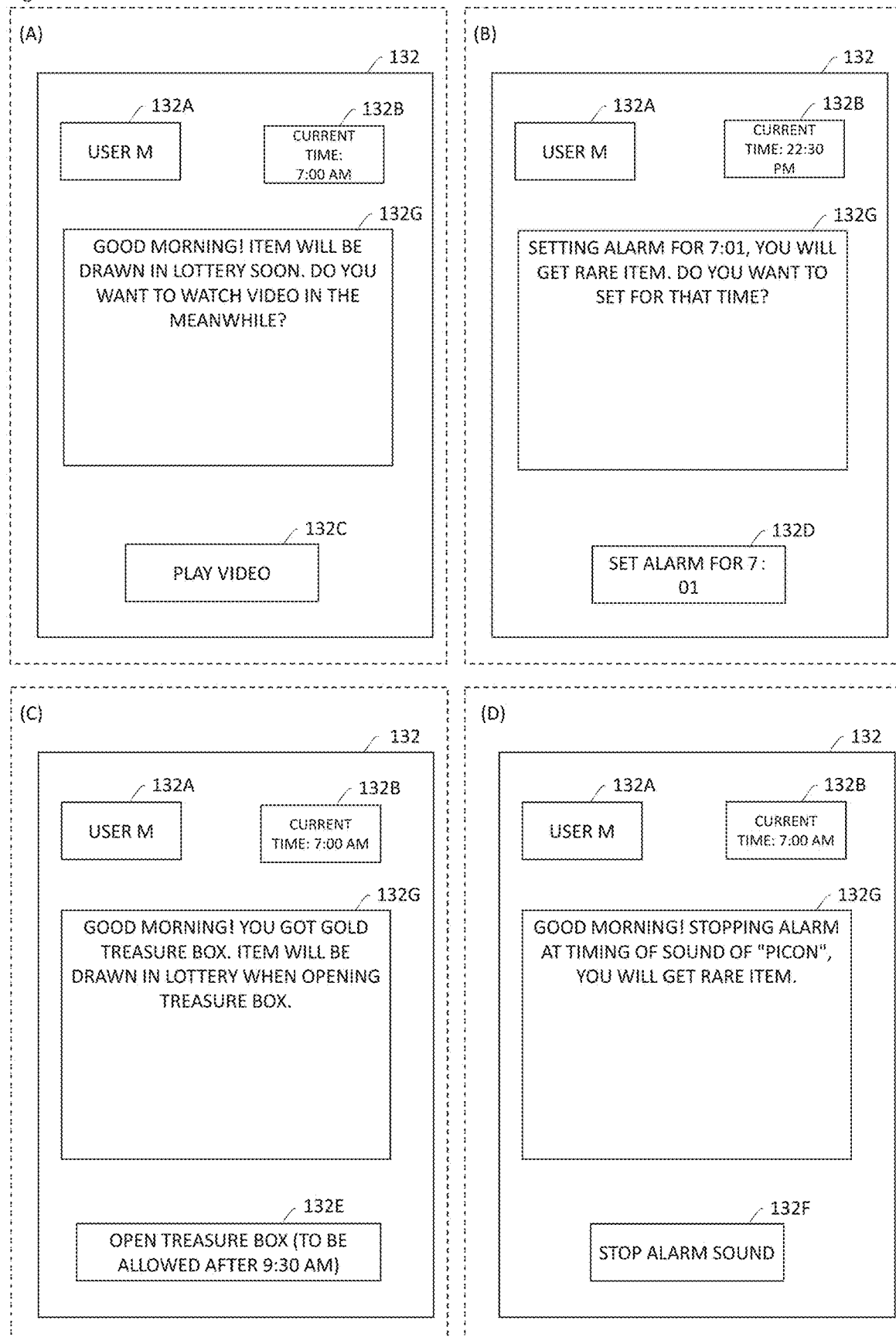
FIG. 6 illustrates screen examples of the terminal device.

FIG. 6 is a diagram illustrating screen examples of the terminal device 10.

A screen example (A) in FIG. 6 illustrates an aspect where a time (second time) at which the server is to be actually accessed to progress the game is determined by randomly delaying a time (first time) at which the game is to progress set by a user.

As illustrated in the screen example (A), the terminal device 10 displays a user name display section 132A, a current time display section 132B, a video play button 132C, and a notification display section 132G on the display 132.

The user name display section 132A is an area for displaying the user name of the corresponding user.

The current time display section 132B is an area for presenting the time when the corresponding screen example is displayed. In the screen example (A), the user sets an alarm activation time as a first time, and the current time is the time when the user woke up due to the activation of the alarm.

The notification display section 132G is an area for notifying the user of details of control for distributing timings of accessing the server. In the screen example (A), the terminal device 10 notifies that the terminal device 10 does not communicate with the server at the first time but accesses the server at a second time randomly delayed from the first time to perform a lottery drawing. In addition, the terminal device 10 notifies the user that a video or the like can be played while waiting for the lottery drawing through the notification display section 132G.

The video play button 132C is an area for the terminal device 10 to receive an operation to play a video from the user.

As a result, the time at which the game is to progress set by each user is randomly delayed, so that it is possible to distribute the times at which users are actually to access the server to progress the game. In a wait time between the time at which the game is to progress and the time at which the server is actually to be accessed to progress the game, a content such as a video is played back to the user, so that the user does not just have to wait but utilize time effectively, and thus to maintain enjoyment of the game.

A screen example (B) is a diagram illustrating an aspect in which a recommended access time is presented to the user.

In the screen example (B), the current time display section 132B is a time at which an alarm activation time, which is a first time, is set before the user goes to bed.

The notification display section 132G presents at least one candidate time to the user as a recommended access time. In a case where the user sets 7:00 as a desired alarm activation time, the terminal device 10 presents time 7:01 as a recommended alarm activation time to the user. The terminal device 10 sets 7:01 as an access time, and notifies the user that a favorable rare item will be given when the server is accessed to progress the game.

An alarm setting button 132D is an area for the terminal device 10 to receive an operation to set the recommended access time as a first time from the user.

As a result, making the setting of a time at which the game is to progress have gaming nature makes it possible to increase enjoyment. In addition, presenting a time at which a concentration of access is unlikely to occur prompts the user to set that time as the access time, making it possible to prevent a concentration of access to the server from occurring.

A screen example (C) is a diagram illustrating an aspect where, at the first time, a right (treasure box) to obtain a game object is given to the user without drawing a game object in a lottery.

In the screen example (C), the user sets an alarm activation time as a first time, and the current time is the time when the user woke up due to the activation of the alarm.

The server 20 displays in the notification display section 132G that a treasure box was given to the user at the first time. The server 20 has determined the timing of opening the treasure box as the second time. The terminal device 10 accesses the server 20 in response to receiving an operation to open the treasure box from the user after the second time arrives, or the terminal device 10 accesses the server 20 when the second time arrives without receiving an operation to open the treasure box. The terminal device 10 notifies that a game object will be drawn when the treasure box is opened through the notification display section 132G. The treasure boxes have different appearances. In the screen example (C), the terminal device 10 notifies that a gold treasure box will be given to the user.

A treasure box open button 132E is an area for the terminal device 10 to receive an operation to open a treasure box to draw an item in a lottery from the user. In this area, a wait time until the second time arrives is displayed.

As a result, the timing of opening a treasure box is set as an actual access time, and actual times at which users are to access the server are distributed, so that it is possible to reduce the communication load between the terminal devices and the server. In addition, objects to be given have different aspects, so that it is possible to make the user have a sense of expectation and increase enjoyment.

A screen example (D) is a diagram illustrating an aspect where the timing of stopping the sound is determined as an actual access time.

In the screen example (D), the user sets an alarm activation time as a first time, and the current time is the time when the user woke up due to the activation of the alarm.

The notification display section 132G notifies that the alarm sound is a sound composed of different sounds, the server is accessed to progress the game at the timing of stopping the alarm sound, and the user will be given a favorable item when the alarm is stopped during play back of a sound of "picon."

An alarm stop button 132F is an area for the terminal device 10 to receive an operation to stop the alarm sound from the user.

As a result, the timing of stopping the sound is set as an actual access time, so that it is possible to distribute actual times at which users are to access the server. In addition, by prompting the user to stop the play back of the predetermined sound, making the setting of a time at which the game is to progress have gaming nature makes it possible to increase enjoyment.

<Conclusion>

The matters described in the respective embodiments will be concluded as follows.

(1) Communication is performed with the server after a wait for a random second for each user instead of communication of sleep information with the server immediately after the user stops the alarm sounding. Meanwhile, the terminal displays an animation to the user, such as that the sleep information is being analyzed or that the sleep information is being communicated to the server. For example, communication is performed after waiting for random seconds between 0 and 5 seconds from the time of the alarm. This reduces the server load per second.

(2) It is expected that each user often sets an alarm at a convenient time. If there is processing to be performed by the server 20 by stopping the alarm, each user is prompted to sound the alarm at a time different from a convenient time. For example, if the user staggers the time at which the alarm is to sound, the user is given an incentive that is favorable to the progress of the game (for example, given an effect of increasing a specific parameter for a character, making it less likely to be abnormal, and given a benefit). As a result, it is possible for the terminal device 10 of each user to set an alarm for a distributed time without excessively concentrating on a convenient time.

(3) Data is transmitted that informs that "the user has woken up" from the terminal to the server without transmitting all the sleep information to the server, when the user stops an alarm sounding on the terminal. The information indicating that "the user has woken up" is a small amount of data as compared to information on results of measuring sleep. The load on the server side is reduced because the server receives data indicating that "the user has woken up" from the terminal, but does not immediately receive information on a measurement result of sleep information from the terminal. Instead of performing game processing (for example, lottery drawing processing) using sleep information on the server when waking up, information indicating the right to obtain a game object by lottery drawing (for example, presented to the user in the form of a treasure box) is presented to the user. The treasure box can be opened after a certain period of time has passed (until the certain period of time has passed, a game object cannot be obtained regardless of the information indicating the right). When receiving an operation as if the user open the treasure box based on that right (an operation for exercising the right), the terminal transmits the measurement result of sleep information to the server at that timing.

(4) An alarm sound is given gaming nature. In addition to normal alarm sounds, different types of alarm sounds are prepared in advance. It is assumed that stopping the alarm at the timing of another type of alarm sound on the terminal instead of a normal alarm sound is favorable to the progress of the game. Here, the timing at which the other type of alarm sounds may be set so as to vary from user to user. This makes it possible to distribute the timings at which the terminals access the server.

Modification Example

In the above description, an example has described in which the server 20 performs the lottery drawing processing based on the determined sleep information. Alternatively, the lottery drawing processing may be performed based on the sleep information that has not been determined.

For example, the following modification example is introduced.

The terminal device 10 accesses the server 20 to progress the game and receives third information for progressing the game from the server 20 before the arrival of the first time at which the predetermined notification is to be made. Then, when receiving a user's operation input in response to a predetermined notification, the terminal device 10 progresses the game based on the third information without accessing to the server 20.

The terminal device 10 receives an operation to start going to bed or falling asleep from the user, and accesses the server 20 before the first time arrives in response to that operation.

(1) In order to measure information about the user's sleep on the terminal device 10 of the user, the terminal device 10 receives an operation to start sleep measurement (for example, display a button to start measuring sleep) from the user. When receiving that operation, the terminal device 10 notifies the server 20 that the operation to start measuring sleep has been performed, and the server 20 then performs lottery drawing processing.

At this time, the server 20 holds lottery drawing results in advance according to the patterns of measurement results of the information on the user's sleep. By the time at which the user is to wake up, the server 20 transmits in advance information on the lottery drawing results of these patterns to the terminal device 10. When the terminal device 10 receives an operation indicating that the user has woken up (such as pressing a button to end sleep measurement), the terminal device 10 determines which of the patterns corresponds to the operation, and performs processing, such as giving a game object according to the sleep measurement result, according to the determination result without accessing the server 20.

The terminal device 10 transmits the result of measuring sleep state to the server 20, the server 20 holds information on the results of measuring sleep state of each user, determines a game object to be given to the user according to the pattern of the result of measuring sleep state, and the like, and updates the information on the user (information on the game objects held and the like).

(2) While the terminal device 10 is measuring information on the user's sleep (in a period of time between sleeping and waking up), the terminal device 10 communicates with the server 20 at regular intervals to transmit the information about sleep to the server 20. The server 20 returns in advance a result of lottery drawing processing and the like to the terminal device 10. For example, information on sleep time is used as the sleep information, and the longer the sleep time, the more times the lottery drawing is performed. Then, if the user is given a game object, for example, the terminal device 10 communicates with the server 20 to perform predetermined lottery drawing processing every time one hour of sleep time elapses before the user stops the alarm to determine the sleep time. Accordingly, at the time when the user woke up, most of the lottery drawing processing has already been performed, and the information on the lottery drawing results on the server 20 is held in advance in the terminal device 10.

When an operation is performed to end the measurement of information about sleep in the terminal device 10 (when an operation for wake-up is performed), the terminal device 10 determines whether it is necessary to communicate with the server 20 again. For example, when information sufficient for lottery drawing processing based on the sleep information is not transmitted from the terminal device 10 to the server 20, re-communication from the terminal device 10 to the server 20 is performed. If re-communication is not necessary, the terminal device 10 does not communicate with the server 20 and displays the result of the processing (lottery drawing processing, and the like) performed by the server 20 to progress the game.

(3) Since it is highly probable that the user will wake up at the time when the alarm sounds, the terminal device 10 and the server 20 communicate with each other a predetermined time (such as 30 minutes) before the alarm sounds. The server 20 receives a signal from the terminal device 10 and then performs lottery drawing. Meanwhile, in order to balance the load, each terminal device 10 and the server 20 sequentially communicate with each other for each of the pieces of identification information of users (user IDs). Specifically, the timing at which each terminal device 10 accesses the server 20 is defined in association with the corresponding user ID. If the user does not wake up (the user does not operate the terminal device 10) even when the alarm sounds, the terminal device 10 discards the lottery drawing result for such a user, and lottery drawing is performed for communication between the terminal device 10 and the server 20 again at the time when the user actually wakes up.

When an operation is performed to end the measurement of information about sleep in the terminal device 10 (when an operation for wake-up is performed), the terminal device 10 determines whether it is necessary to communicate with the server 20 again. For example, when information sufficient for lottery drawing processing based on the sleep information is not transmitted from the terminal device 10 to the server 20, re-communication from the terminal device 10 to the server 20 is performed. If re-communication is not necessary, the terminal device 10 does not communicate with the server 20 and displays the result of the processing (lottery drawing processing, and the like) performed by the server 20 to progress the game.

(4) If it is possible to measure whether or not the user's sleep is deep, the terminal sounds an alarm when the terminal detects that the user's sleep is light. As a result, it is possible to distribute the timings at which the users are to wake up regardless of the alarm times set by the users.

(5) A mini-game is made playable after the user stops the alarm on the terminal. Since the time it takes to finish playing the mini-game varies from user to user, access to the server from the terminal after playing the mini-game can prevent excessive concentration of access to the server.

(6) Instead of the user setting an alarm time, the game side based on a game program presents an alarm time to each user. For example, it is assumed that the terminal allows the user to make a setting such as "an alarm will sound when you sleep 8 hours from now." As a result, users wake up at different times, so that the communication load on the server can be reduced. The user side can also ensure sleep time and get a good night's sleep.

<Supplements>

The matters described in the respective embodiments will be supplemented hereinafter.

(Supplement 1) A game program for being executed by a computer including a processor, the game program causing the processor to execute the steps of: receiving an operation input from a user (S511); setting a first time at which a game is to progress and making a predetermined notification at the first time when the operation input is not received before the first time arrives (S512); changing a state of the notification based on the operation input of the user and accessing a server to progress the game (S513); and distributing second times at which the computers of users are to access the server to progress the game (S521).

(Supplement 2) The game program according to (Supplement 1), wherein the accessing the server to progress the game includes determining a game object which is to appear in the game played by the user by processing based on first information determined when receiving the operation input of the user, and causing the server to hold information on the determined game object in association with the user (S522).

(Supplement 3) The game program according to (Supplement 2), wherein the accessing the server to progress the game includes determining temporal information when receiving the operation input of the user; and determining the game object to be associated with the user by the server performing lottery drawing processing with the determined temporal information as the first information.

(Supplement 4) The game program according to (Supplement 3), wherein the first time is set as a time at which an alarm is to sound, and the accessing the server to progress the game includes receiving an operation for wake-up as the operation input of the user; and determining information about sleep of the user as the temporal information when receiving the operation for wake-up.

(Supplement 5) The game program according to any one of (Supplement 2) to (Supplement 4), wherein the step of distributing includes distributing the second times in such a manner that timings at which a plurality of users are to access the server are distributed after operation inputs of the users are received.

(Supplement 6) The game program according to any one of (Supplement 1) to (Supplement 5), wherein the step of distributing includes transmitting second information indicating that the operation input of the user has been received to the server; determining, by the server, a wait time that may be different for each of the users who have received the second information; and transmitting, by the server, the determined wait time to the computers of the users, and the step of distributing includes presenting information indicating the wait time to the user.

(Supplement 7) The game program according to (Supplement 6), wherein the step of distributing includes updating the information indicating the wait time over time and presenting the resulting information to the user; not allowing to receive a predetermined operation to access the server from the user until the wait time has elapsed; and in response to the elapsed time, allowing to receive the predetermined operation to access the server from the user.

(Supplement 8) The game program according to any one of (Supplement 1) to (Supplement 7), wherein the step of distributing includes setting, by the computer, the first time based on a result of distributing first times set for the users at which the predetermined notification is to be made.

(Supplement 9) The game program according to (Supplement 8), wherein the step of distributing includes presenting the result of distributing the first times set for the users to the user of the computer; and receiving an operation from the user to approve a change of the first time to set the changed first time.

(Supplement 10) The game program according to (Supplement 8), further comprising a step of sensing a sleeping state of the user, wherein the step of making the predetermined notification includes setting the first time based on the results of distributing; and making the predetermined notification based on a result of sensing the sleeping state of the user even though the first time has been set, and the step of accessing includes accessing the server when receiving the operation input from the user in response to the predetermined notification.

(Supplement 11) The game program according to any one of (Supplement 1) to (Supplement 10), wherein the step of distributing includes making a specific notification according to an elapsed time from the first time in response to the predetermined notification based on arrival of the first time.

(Supplement 12) The game program according to (Supplement 11), wherein the step of distributing includes giving a benefit to the user when receiving an operation input for accessing the server to progress the game from the user based on a timing of making the specific notification.

(Supplement 13) The game program according to any one of (Supplement 1) to (Supplement 12), wherein the step of distributing includes accessing the server to progress the game and receiving third information for progressing the game from the server before arrival of the first time at which the predetermined notification is to be made; and progressing the game on the computer based on the third information without accessing to the server when receiving the operation input in response to the predetermined notification.

(Supplement 14) The game program according to (Supplement 13), comprising receiving an operation to start going to bed or falling asleep from the user; and accessing the server before the first time arrives in response to the operation.

The invention claimed is:

1. A non-transitory computer-readable game program for being executed by a computer including a processor, the game program causing the processor to execute the steps of:
   receiving an operation input from a user;
   setting a first time at which a game is to progress and making a predetermined notification at the first time when the operation input is not received before the first time arrives;
   changing a state of the notification based on the operation input of the user and accessing a server to progress the game;
   dynamically controlling server access timing based on server processing capacity by randomly delaying the first time set for each user to generate corresponding second times; and
   distributing second times at which computers of users are to access the server to progress the game.

2. The non-transitory computer-readable game program according to claim 1, wherein the accessing the server to progress the game includes determining a game object which is to appear in the game played by the user by processing based on first information determined when receiving the operation input of the user, and causing the server to hold information on the determined game object in association with the user.

3. The non-transitory computer-readable game program according to claim 2, wherein the accessing the server to progress the game includes
   determining temporal information when receiving the operation input of the user; and
   determining the game object to be associated with the user by the server performing lottery drawing processing with the determined temporal information as the first information.

4. The non-transitory computer-readable game program according to claim 3, wherein
   the first time is set as a time at which an alarm is to sound, and
   the accessing the server to progress the game includes
   receiving an operation for wake-up as the operation input of the user; and
   determining information about sleep of the user as the temporal information when receiving the operation for wake-up.

5. The non-transitory computer-readable game program according to claim 2, wherein the distributing includes distributing the second times in such a manner that timings at which a plurality of users are to access the server are distributed after operation inputs of the users are received.

6. The non-transitory computer-readable game program according to claim 5, wherein the distributing includes
transmitting second information indicating that the operation input of the user has been received to the server;
determining, by the server, a wait time that may be different for each of the users who have received the second information; and
transmitting, by the server, the determined wait time to the computers of the users, and
presenting information indicating the wait time to the user.

7. The non-transitory computer-readable game program according to claim 6, wherein the distributing includes
updating the information indicating the wait time over time and presenting the resulting information to the user;
not allowing receiving a predetermined operation to access the server from the user until the wait time has elapsed; and
in response to the elapsed time, allowing receiving the predetermined operation to access the server from the user.

8. The non-transitory computer-readable game program according to claim 1, wherein the distributing includes setting, by the computer, the first time based on a result of distributing first times set for the users at which the predetermined notification is to be made.

9. The non-transitory computer-readable game program according to claim 8, wherein the distributing includes
presenting the result of distributing the first times set for the users to the user of the computer; and
receiving an operation from the user to approve a change of the first time to set the changed first time.

10. The non-transitory computer-readable game program according to claim 8, further comprising
sensing a sleeping state of the user, wherein making the predetermined notification includes
setting the first time based on the results of distributing; and
making the predetermined notification based on a result of sensing the sleeping state of the user even though the first time has been set, and
accessing the server when receiving the operation input from the user in response to the predetermined notification.

11. The non-transitory computer-readable game program according to claim 1, wherein the distributing includes making a specific notification according to an elapsed time from the first time in response to the predetermined notification based on arrival of the first time.

12. The non-transitory computer-readable game program according to claim 11, wherein the distributing includes giving a benefit to the user when receiving an operation input for accessing the server to progress the game from the user based on a timing of making the specific notification.

13. The non-transitory computer-readable game program according to claim 1, wherein the distributing includes
accessing the server to progress the game and receiving third information for progressing the game from the server before arrival of the first time at which the predetermined notification is to be made; and
progressing the game on the computer based on the third information without accessing to the server when receiving the operation input in response to the predetermined notification.

14. The game program according to claim 13, comprising:
receiving an operation to start going to bed or falling asleep from the user; and
accessing the server before the first time arrives in response to the operation.

15. A method for executing a game, comprising:
receiving an operation input from a user;
setting a first time at which the game is to progress and making a predetermined notification at the first time when the operation input is not received before the first time arrives;
accessing a server to progress the game based on the operation input of the user;
dynamically controlling server access timing based on server processing capacity by randomly delaying the first time set for each user to generate corresponding second times; and
distributing second times at which the users are to access, by a user device, the server to progress the game.

16. An information processing device, comprising:
circuitry configured to
receive an operation input from a user,
set a first time at which a game is to progress and making a predetermined notification at the first time when the operation input is not received before the first time arrives,
access a server to progress the game based on the operation input of the user,
dynamically controlling server access timing based on server processing capacity by randomly delaying the first time set for each user to generate corresponding second times, and
distribute second times at which the information processing devices of users are to access the server to progress the game.

* * * * *